US008332858B2

(12) United States Patent
Krauss

(10) Patent No.: US 8,332,858 B2
(45) Date of Patent: *Dec. 11, 2012

(54) LOCK SUITABILITY ANALYSIS DURING EXECUTION OF COMPUTER PROGRAM UNDER TEST

(75) Inventor: Kirk J. Krauss, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 1494 days.

This patent is subject to a terminal disclaimer.

(21) Appl. No.: 11/617,621

(22) Filed: Dec. 28, 2006

(65) Prior Publication Data

US 2008/0163175 A1 Jul. 3, 2008

(51) Int. Cl.
G06F 9/46 (2006.01)
G06F 9/44 (2006.01)
(52) U.S. Cl. ........................................ 718/104; 717/131
(58) Field of Classification Search .................. 717/127, 717/131; 718/104
See application file for complete search history.

(56) References Cited

U.S. PATENT DOCUMENTS

| | | | |
|---|---|---|---|
| 5,822,588 A | 10/1998 | Sterling et al. | |
| 6,343,371 B1 | 1/2002 | Flanagan et al. | |
| 6,757,891 B1 * | 6/2004 | Azagury et al. | 717/158 |
| 8,095,921 B2 * | 1/2012 | Krauss | 717/151 |
| 2003/0056149 A1 | 3/2003 | Hue | |
| 2003/0236951 A1 | 12/2003 | Choi et al. | |
| 2005/0028157 A1 * | 2/2005 | Betancourt et al. | 718/100 |
| 2005/0081206 A1 | 4/2005 | Armstrong et al. | |

OTHER PUBLICATIONS

Xu et al. "Dynamic Instrumentation of Threaded Applications", PPoPP '99 Proceedings of the seventh ACM SIGPLAN symposium on Principles and practice of parallel programming, 1999.*
Anderson, et al., "Quartz: A Tool for Tuning Parallel Program Performance", Department of Computer Science and Engineering, University of Washington, pp. 115-125 (1989).
Choi, et al., "Efficient and Precise Datarace for Multithreaded Object-Oriented Programs", PLDI '02, Jun. 17-19, 2002, Berlin, Germany, pp. 1-12.
Savage, et al., "Eraser: A Dynamic Data Race Detector for Multithreaded Programs", ACM Transactions on Computer Systems, vol. 15, No. 4, pp. 391-411 (1997).
Bernat, et al., "Multithreaded Support for Paradyn", Computer Sciences Department, University of Wisconsin-Madison, pp. 1-27 (2001).

* cited by examiner

*Primary Examiner* — Jennifer To
*Assistant Examiner* — Brian Chew
(74) *Attorney, Agent, or Firm* — Holland & Knight LLP; Brian J. Colandreo, Esq.; Jeffrey T. Placker, Esq.

(57) ABSTRACT

A method and computer program product for detecting an attempt to engage a synchronization object. A tracking list for a line of code that attempted to engage the synchronization object is updated.

14 Claims, 8 Drawing Sheets

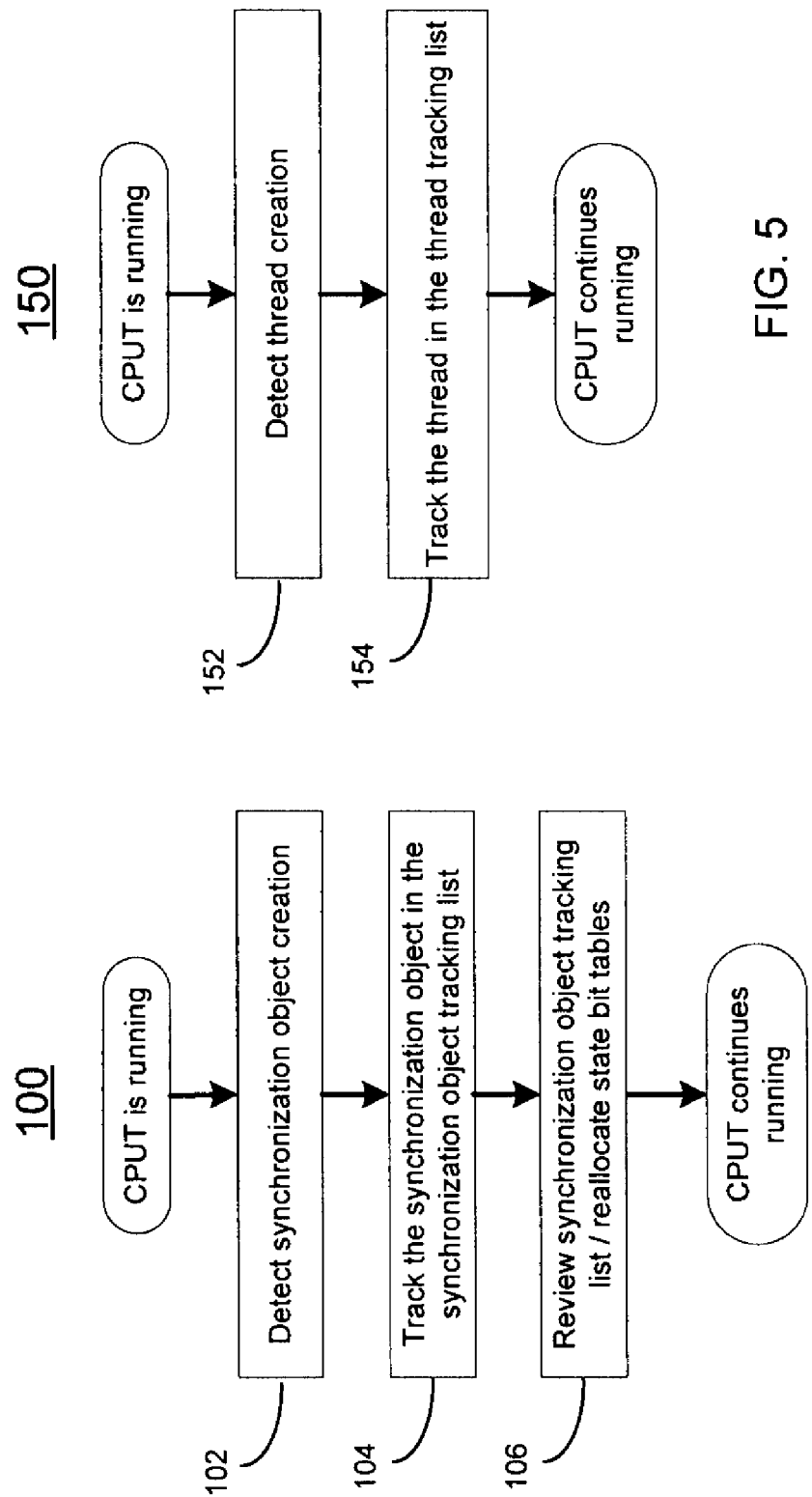

LOCK SUITABILITY ANALYSIS DURING EXECUTION OF COMPUTER PROGRAM UNDER TEST

TECHNICAL FIELD

This disclosure relates to lock analysis systems and, more particularly, to system and methods that analyze the suitability of lock usage.

BACKGROUND

On conventional multiprocessor systems running standard operating systems, multithreaded applications are nominally multiprocessor-exploitive because the threads of the application are assigned to individual processors that can run them concurrently. However, the degree to which a multithreaded program is actually multiprocessor-exploitive may vary depending on the design of the application itself.

Unfortunately, such a multithreaded program may fail when individual threads of the program block a resource and prevent other threads from operating, thus allowing one or more processors to idle while useful computations could have occurred. If runtime analysis determines that the protection of a resource is unnecessary (i.e., unsuitable) during execution (e.g., because only one thread accesses the protected resource), then this unsuitability could be indicated to the software developer.

SUMMARY OF DISCLOSURE

In a first implementation of this disclosure, a lock suitability analysis method includes detecting an attempt to engage a synchronization object. A tracking list for a line of code that attempted to engage the synchronization object is updated.

One or more of the following features may also be included. A determination may be made concerning whether another thread has already engaged the synchronization object. If so, a synchronization object tracking list for the synchronization object may be updated to indicate that the synchronization object has caused a task switch. If not, the synchronization object tracking list for the synchronization object may be updated to indicate that the synchronization object is currently-held by a current thread.

A determination may be made concerning whether a call chain has been previously-collected that defines the line of code that is currently engaging the synchronization object. If so, the call chain may be collected.

An access of a resource may be detected. A determination may be made concerning whether the resource was previously-defined "apparently unsuitable" for the currently-held synchronization object. If so, the resource may be defined as "definitely suitable" for protection by the currently-held synchronization object.

One or more engaged synchronization objects may be defined. One or more state bits may be set to indicate that the resource was accessed by a current thread while the one or more engaged synchronization objects were engaged.

A determination may be made concerning whether one or more other threads have accessed the resource while holding at least one of the synchronization objects now held by the current thread. If so, one or more counters associated with the currently-held synchronization object may be incremented to indicate that the resource is "apparently suitable" for protection by the currently-held synchronization object.

A determination may be made concerning whether one or more counters associated with the currently-held synchronization object indicate that the resource may be "definitely suitable" for protection by the currently-held synchronization object. If not, the one or more counters associated with the currently-held synchronization object may be incremented to indicate that the resource is "apparently unsuitable" for protection by the currently-held synchronization object.

An attempt to disengage the synchronization object may be detected. A determination may be made concerning whether the engagement of the synchronization object caused a task switch and a ratio of suitable to unsuitable resource accesses was above a user-defined threshold. If not, the tracking list for the line of code may be updated to indicate that the line of code is "apparently unsuitable".

A determination may be made concerning whether the line of code that engaged the synchronization object was once identified as "apparently unsuitable". If so, the tracking list for the line of code may be updated to indicate that the line of code is "definitely suitable". The call chain leading to the line of code may be dropped.

A program termination condition and/or a data request may be detected. A determination may be made concerning whether any lines of code that engaged any synchronization object are defined as "apparently unsuitable". If so, at least one of the lines of code may be reported.

In another implementation of this disclosure, a computer program product includes a computer useable medium having a computer readable program. The computer readable program, when executed on a computer, causes the computer to detect an attempt to engage a synchronization object. A tracking list for a line of code that attempted to engage the synchronization object is updated.

One or more of the following features may also be included. A determination may be made concerning whether another thread has already engaged the synchronization object. If so, a synchronization object tracking list for the synchronization object may be updated to indicate that the synchronization object has caused a task switch. If not, the synchronization object tracking list for the synchronization object may be updated to indicate that the synchronization object is currently-held by a current thread.

A determination may be made concerning whether a call chain has been previously-collected that defines the line of code that is currently engaging the synchronization object. If so, the call chain may be collected.

An access of a resource may be detected. A determination may be made concerning whether the resource was previously-defined "apparently unsuitable" for the currently-held synchronization object. If so, the resource may be defined as "definitely suitable" for protection by the currently-held synchronization object.

One or more engaged synchronization objects may be defined. One or more state bits may be set to indicate that the resource was accessed by a current thread while the one or more engaged synchronization objects were engaged.

A determination may be made concerning whether one or more other threads have accessed the resource while holding at least one of the synchronization objects now held by the current thread. If so, one or more counters associated with the currently-held synchronization object may be incremented to indicate that the resource is "apparently suitable" for protection by the currently-held synchronization object.

A determination may be made concerning whether one or more counters associated with the currently-held synchronization object indicate that the resource may be "definitely suitable" for protection by the currently-held synchronization object. If not, the one or more counters associated with the currently-held synchronization object may be incremented to indicate that the resource is "apparently unsuitable" for protection by the currently-held synchronization object.

An attempt to disengage the synchronization object may be detected. A determination may be made concerning whether the engagement of the synchronization object caused a task switch and a ratio of suitable to unsuitable resource accesses was above a user-defined threshold. If not, the tracking list for the line of code may be updated to indicate that the line of code is "apparently unsuitable".

A determination may be made concerning whether the line of code that engaged the synchronization object was once identified as "apparently unsuitable". If so, the tracking list for the line of code may be updated to indicate that the line of code is "definitely suitable". The call chain leading to the line of code may be dropped.

A program termination condition and/or a data request may be detected. A determination may be made concerning whether any lines of code that engaged any synchronization object are defined as "apparently unsuitable". If so, at least one of the lines of code may be reported.

The details of one or more implementations are set forth in the accompanying drawings and the description below. Other features and advantages will become apparent from the description, the drawings, and the claims.

BRIEF DESCRIPTION OF THE DRAWINGS

FIG. 4 is a flowchart of a portion of the lock suitability analysis process of FIG. 1;

FIG. 5 is a flowchart of a portion of the lock suitability analysis process of FIG. 1;

DETAILED DESCRIPTION OF THE PREFERRED EMBODIMENTS

Figure 1:
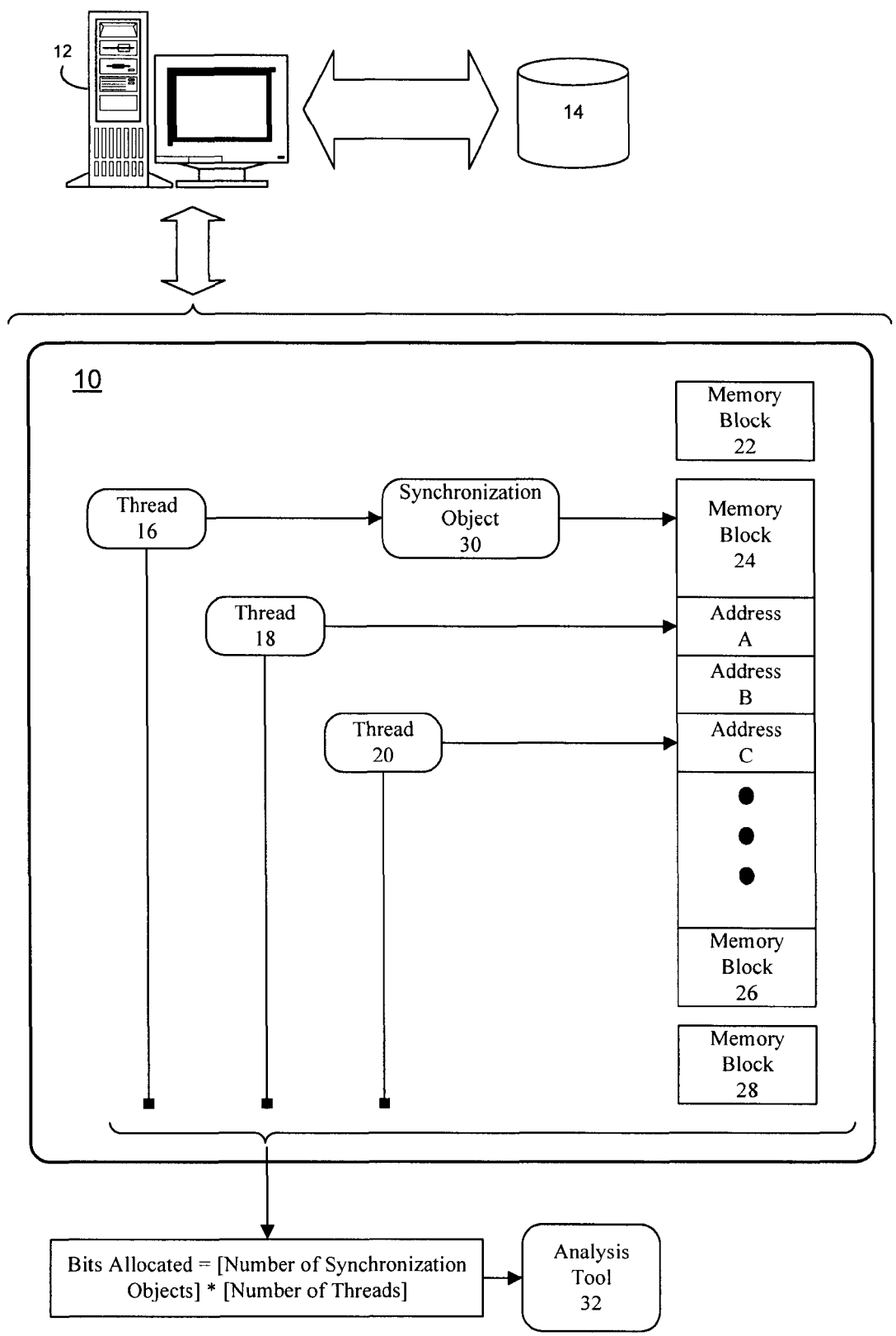
FIG. 1 is a diagrammatic view of a lock suitability analysis process executed in whole or in part by a computer.

Overview:

As will be discussed below in greater detail, this disclosure may take the form of an entirely hardware embodiment, an entirely software embodiment or an embodiment containing both hardware and software elements. In a preferred embodiment, this disclosure may be implemented in software, which may include but is not limited to firmware, resident software, microcode, etc.

Furthermore, this disclosure may take the form of a computer program product accessible from a computer-usable or computer-readable medium providing program code for use by or in connection with a computer or any instruction execution system. For the purposes of this description, a computer-usable or computer readable medium may be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks may include, but are not limited to, compact disc-read only memory (CD-ROM), compact disc-read/write (CD-R/W) and DVD.

A data processing system suitable for storing and/or executing program code may include at least one processor coupled directly or indirectly to memory elements through a system bus. The memory elements may include local memory employed during actual execution of the program code, bulk storage, and cache memories that may provide temporary storage of at least some program code in order to reduce the number of times code must be retrieved from bulk storage during execution.

Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Many programming languages, operating systems, and other software development environments support what are known as "threads" of execution. Threads are similar to processes, in that each represents a single sequence of computer program instructions that can be executed in parallel with other sequences of instructions. Threads are executed in parallel within a computer system using technologies such as time slicing and preemption. In essence, threads provide a mechanism by which a computer program may "split itself" into two or more simultaneously running tasks.

Because threads are capable of operating in parallel, there may be a scenario in which more than one thread tries to access to a given computer resource (e.g., a portion of memory) at the same time. In the typical case, a thread requires constantly unshared access to a portion of memory during the time while a particular set of instructions is executing. That is, the thread reads and writes to a given portion of memory. During that time, if another thread writes to the same portion of memory, the data may become inaccurate, "clobbered", or otherwise corrupted.

To avoid such a condition, synchronization objects, also referred to as "locks", are usually employed. Examples of synchronization objects may include, but are not limited to, defining a portion of code as a "critical section" that requires the use of a particular application programming interface (API), semaphores, or the like, for accessing the resource. In general, once a synchronization object is engaged by e.g., "Thread A", the synchronization object may prevent e.g., "Thread B" and "Thread C" from also engaging the synchronization object. This causes "Thread B" and "Thread C", which must engage the synchronization object, to block (e.g., wait) until the synchronization object is removed or disengaged by "Thread A".

This disclosure provides a runtime analysis tool (or a portion thereof) for evaluating a computer program under test (i.e., CPUT). During execution of the CPUT, information relating to the use of synchronization objects by various threads may be collected. The synchronization object usage information may be analyzed to identify candidate portions of computer program code (included within CPUT) that, according to analysis criteria, cause a higher than acceptable number of threads to wait for a given synchronization object. Since threads waiting for synchronization objects may waste significant computing time, bringing such portions of code to the attention of a software developer may aid in the optimization and improvement of CPUT.

The various functions described herein may be implemented within a software analysis tool. In one embodiment, for example, the various functions described herein may be implemented as extensions of one or more members of the Rational PurifyPlus family of software analysis tools that are commercially available from International Business Machines Corporation of Armonk, N.Y. (IBM). PurifyPlus is a family of computer programs that provide runtime analysis functionality to software developers and testers. In general, runtime analysis refers to the practice of analyzing and understanding application behavior using data collected during execution of a CPUT.

The subject matter of this disclosure may include functionality for generating call graphs via runtime analysis. A tool called Quantify, for example, which is a member of the PurifyPlus product family, may produce call graphs for a CPUT. In general, a call graph may refer to a diagram that identifies the functions, methods, and/or modules in a system or computer program and shows which functions, methods, and/or modules invoke one another. A call graph may also be referred to as a call tree or a tier chart.

The various development activities that may be analyzed using PurifyPlus may include, but are not limited to, memory corruption detection and memory profiling in native C/C++ applications, memory profiling in Java and .NET managed code applications, performance profiling to identify slow or inefficient portions of code, code coverage analysis, and runtime tracing. PurifyPlus may also perform thread profiling. Thread profiling may entail inspecting and preventing intermittent hangs, data corruption, or performance degradation due to deadlocks, race conditions, and/or thread starvation.

The various functionality disclosed herein is intended to provide a basis for teaching one skilled in the art to better understand the concepts disclosed herein. It should be appreciated, however, that the present disclosure may be implemented as a standalone application, as part of a larger application or in virtually any appropriately detailed structure, computer program, and/or portion thereof.

A data structure used to track the function parameters associated with a particular call to a function, during execution of a computer program under test, may be called a parameters data structure.

A data structure used to track the sequence of function calls, during execution of a computer program under test, may be called a stack frame data structure. A set of these data structures can be interlinked to represent the execution flow of the computer program under test as a directed graph, commonly known as a call graph or call tree.

Space may be allocated for tracking the parameters for a function at runtime, when the function is called. One or more of these data structures may be associated with the stack frame data structure that is in turn associated with a particular function tracked in the call graph.

A basic block may be a set of instructions, within a function, that run as a deterministic sequence. Once a basic block is entered, every instruction in the basic block may execute, unless an exception or program termination condition occurs. A data structure used to track the order of execution of the basic block within a function, during a particular call to that function, may be called a basic block set descriptor data structure. Space may be allocated for tracking a basic block set descriptor for a function at runtime, when the function is called. One or more of these data structures may be associated with the stack frame data structure that is in turn associated with a particular function tracked in the call graph.

Referring to FIG. 1, there is shown a lock suitability analysis process 10 resident on (in whole or in part) and executed by (in whole or in part) analysis computer 12 (e.g., a single server computer, a plurality of server computers, or a general purpose computer, for example). As will be discussed below in greater detail, lock suitability analysis process 10 may analyze a threading model used in a CPUT to identify deficiencies in the threading model that may lead to inefficient computation usage. Lock suitability analysis process 10, which may be included within the above-described software analysis tools, may include several sub-processes, each of which will be discussed below in greater detail.

The instruction sets and subroutines of lock suitability analysis process 10, which may be stored on a storage device 14 coupled to computer 12, may be executed by one or more processors (not shown) and one or more memory architectures (not shown) incorporated into computer 12. Storage device 14 may include, but is not limited to, a hard disk drive, a tape drive, an optical drive, a RAID array, a random access memory (RAM), or a read-only memory (ROM).

FIG. 1 is illustrative of the execution of CPUT, which may include a plurality of threads (e.g., threads 16, 18, 20). During execution of CPUT, threads 16, 18, 20 may access memory blocks 22, 24, 26, 28. Access to memory blocks 22, 24, 26, 28 may be gained through various functions (e.g., "malloc" in the C programming language) or via other heap allocation mechanisms, and may be accessed through memory read and write operations such as register load and store instructions.

As shown, thread 16 has engaged synchronization object 30 to protect memory block 24. Analysis tool 32, such as one of the variety already described herein, may evaluate the execution of the CPUT, and e.g., note which threads have accessed which memory blocks and/or addresses within the memory blocks. Lock suitability analysis process 10 may be a portion of (or incorporated into) analysis tool 32.

In order to track the different accesses of memory blocks 22, 24, 26, 28 by threads 16, 18, 20, analysis tool 32 may allocate a particular portion of memory referred to as state memory. The size of the state memory may be dictated by one or more parameters. In one embodiment, for example, the number of state bits allocated for tracking purposes may be calculated as follows: (state bits allocated)=(# of synchronization objects)×(# of threads). As memory block addresses are accessed by threads, bits in the state memory may be allocated and set accordingly.

It should be appreciated, however, that other tracking and memory allocation mechanisms may be used for tracking thread activity, synchronization object usage, resources protected by synchronization objects, and the timing of such activities. Accordingly, the present disclosure is not intended to be limited to the use of one particular technique or data structure. For example, lists and any other suitable data structures may also be used.

For example, the state memory may indicate that thread 16 has engaged synchronization object 30 to protect memory block 24. During the time that synchronization object 30 was engaged by thread 16, thread 18 and thread 20 may have waited for synchronization object 30, though neither of threads 18, 20 ever accessed memory block 24 during that time within the run of CPUT. Alternatively, in a more rigorous embodiment in which each individual memory address is associated with its own state bit tracking, the state memory may further indicate the addresses (within a memory block) that are accessed by threads. For example, the state memory may indicate that thread 18 attempted to access "Address A" of memory block 24 and that thread 20 attempted to access "Address C" of memory block 24 during the time that synchronization object 30 protected memory block 24 on behalf of thread 16, which has not accessed either "Address A" or "Address C" thus far during this run of CPUT. This scenario may represent a situation in which the memory block (or individual memory addresses within the memory block), may be tagged as unsuitable for protection by a synchronization object 30, as threads 18, 20 needlessly waited to access "Address A" and "Address C" (respectively), even though thread 16 did not access those addresses within memory block 24.

It should be appreciated that FIG. 1 is presented for illustrative purposes only and that the present disclosure is not intended to be restricted by the number of threads or memory blocks shown. That is, CPUT may include a greater or lesser number of threads and/or a greater or lesser number of memory blocks. Further, although memory blocks are shown to illustrate particular aspects of the present disclosure, it should be appreciated that the arrangements disclosed herein may be applied to other resources that may be protected and/or regulated through the use of synchronization (e.g., individual memory addresses; peripheral devices; and any other resource that may require synchronized access). Accordingly, the present disclosure is not intended to be limited solely to the observation of memory block access.

Figure 2:
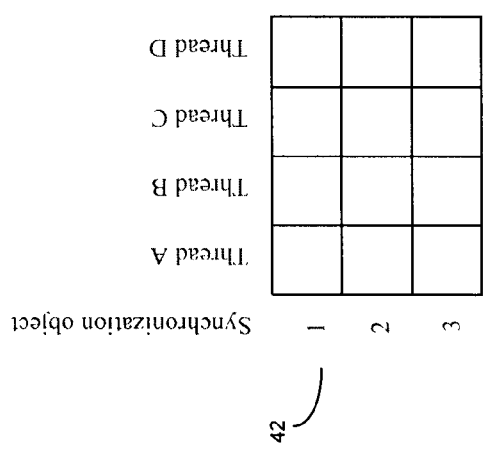
FIG. 2 is a diagrammatic view of state memory for use by the lock suitability analysis process of FIG. 1.

FIG. 2 is a pictorial diagram illustrating state memory 40 (as discussed above) in accordance with one embodiment of this disclosure. As discussed above, the size of state memory 40 may be dictated by one or more parameters, such as the product of the (# of synchronization objects) and (# of threads). FIG. 2 is illustrative of a simple state bit management scheme. In this illustration, state memory 40 may include a table having twelve state bits allocated per resource (e.g., per memory block). Such a configuration assumes that three synchronization objects and four threads exist at resource allocation time. It should be appreciated that greater or fewer synchronization objects and/or threads may be in existence and that, therefore, the number of state bits indicated herein is for illustrative purposes only and is not intended to be a limitation of this disclosure.

The state bits included within state memory 40 may represent information on a per synchronization object and per thread basis. For example, a "0" entry in table 42 may indicate that the resource has not been accessed by the indicated thread while the indicated synchronization object was engaged. A "1" entry in table 42 may indicate that the resource has been accessed by the indicated thread while the indicated synchronization object was engaged. Because resources may continue to be accessed while additional threads and synchronization objects are created, the state bit table 42 associated with each resource may be enlarged (via reallocation) to accommodate additional state bit requirements when a resource is accessed.

FIGS. 3-12 are a series of flow charts of sub-processes that may be included within lock suitability analysis process 10, each of which will be discussed below in greater detail. As noted, the various methods disclosed herein may be implemented using a runtime analysis tool 32 (as previously described). Further, the sub-processes may begin in a state where runtime analysis tool 32 has been started and is monitoring CPUT, which is also being executed.

Lock Suitability Analysis Process

Figure 3:
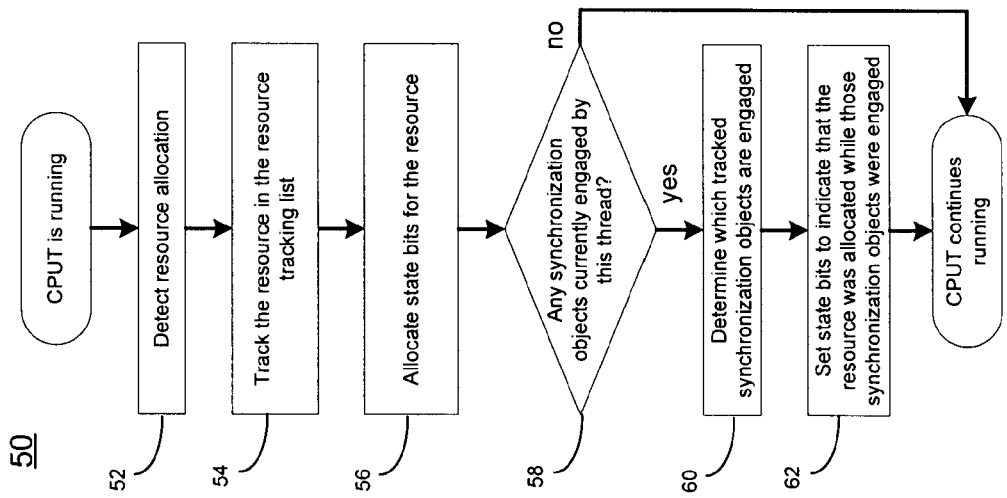
FIG. 3 is a flowchart of a portion of the lock suitability analysis process of FIG. 1.

Referring to FIG. 3, there is shown one embodiment of a process 50 for detecting resource allocation. As discussed above, a resource may include, but is not limited to, a memory block, an individual memory address; a peripheral device; and any other resource that may require synchronized access. Resources may be tracked via resource tracking lists, examples of which may include but are not limited to ordered link lists and skiplists. A linked list is a data structure used in computer programming that defines a sequence of nodes, each of which may contain arbitrary data fields and one or two references (or links) pointing to the next and/or previous nodes. A skiplist is an augmentation of the above-described linked list. Skiplists may include forward links that allow for accelerated searching of the list by skipping parts of the list. When a resource is allocated, a list entry may be created for the allocated resource and inserted into the above-described resource tracking list. Each list entry may serve as an anchor for (or root of) a call chain, or a state bit table. Accordingly, each list entry may serve as an anchor for a call chain that may be collected if the resource is later determined to be unsuitably protected by one or more synchronization objects. Further, each list entry may also anchor a state bit table that may be updated as the allocated resource is accessed (as discussed below in greater detail). For example, when a memory block is accessed by a thread that has caused another thread to wait, state bits within the state bit table may be allocated (if the first occurrence) or updated (if a subsequent occurrence) to indicate such access. A similar scheme may be applied for other resources (e.g., an individual memory addresses; peripheral devices; and any other resource that may require synchronized access).

A set of count fields, containing one "unsuitability" counter per synchronization object, may also be tracked in the resource's skiplist entry. When the resource is accessed by a thread that has caused another thread to block, if synchronization objects are "apparently unsuitably" engaged, each unsuitability count is incremented. If a synchronization object is later determined to be "definitely suitable" for the memory block, the relevant counters are set to a special value (e.g., −1) to indicate this. A similar scheme may be applied to other resources (not just memory blocks), such as individual memory addresses; peripheral devices; and any other resources that may require synchronized access.

Accordingly and as illustrated in FIG. 3, during execution of CPUT, when process 50 detects 52 a resource allocation, process 50 may track 54 the resource in a resource tracking list (e.g., the above-described ordered link lists and skiplists) and may allocate 56 state bits for the resource. Process 50 may determine 58 if any synchronization objects are currently engaged by the thread attempting to access the resource. If 58 synchronization objects are currently engaged, process 50 may determine 60 which synchronization objects are engaged. State bits may be set 62 to indicate that the resource being allocated was allocated while the above-described synchronization objects were engaged.

Referring to FIG. 4, there is shown one embodiment of a process 100 for detecting synchronization object creation. When a synchronization object (e.g., a lock) is created, a list entry may be created for the synchronization object and placed within a synchronization object tracking list (e.g., an ordered link list or a skiplist). Each entry within the synchronization object tracking list may serve as an anchor for a call chain and a set of pointers to thread tracking structures. The pointers, initialized to NULL values, may be set whenever a thread is holding or waiting for the synchronization object and, therefore, may define the thread currently holding the lock and one or more threads that are currently waiting for the lock to be come available.

Interception of synchronization application programming interfaces (APIs) such as the InitializeCriticalSection( ), EnterCriticalSection( ), and LeaveCriticalSection( ) APIs available on computer systems running a Microsoft® Windows® variety of operating system can be used to indicate the fact that a synchronization object exists, that a thread is attempting to engage that synchronization object, and that a thread is attempting to disengage the synchronization object, respectively.

Accordingly and as illustrated in FIG. 4, during execution of CPUT, process 100 may detect 102 the creation of a synchronization object, examples of which may include but are not limited to a lock. Process 100 may track 104 the synchronization object in the above-described synchronization object tracking list. Process 100 may review 106 the list of tracked resources and reallocate any associated state bit tables to include a row representing the added synchronization object. As discussed above and as shown in FIG. 2, state bit table 42 is shown to include three rows (i.e., "1", "2" and "3"), each of which corresponds to a synchronization object created during the execution of CPUT. Accordingly, if a fourth synchronization object is created, the state bit table associated with each of allocated resource (e.g., memory block) may be expanded to track the newly-created synchronization object.

Referring to FIG. 5, there is shown one embodiment of a process 150 for detecting thread creation. When a thread is created, a list entry may be created for the newly-created thread and inserted into a thread tracking list (e.g., an ordered link list or a skiplist). Each list entry within the thread tracking list may serve as an anchor for a call chain and a record of whether the thread is waiting for a synchronization object. Accordingly, upon process 150 detecting 152 the creation of a thread during execution of CPUT, process 150 may track 154 the thread in the above-described thread tracking list.

Thread creation may be intercepted via hooks of one form or another on most computer systems. On computer systems running a Microsoft® Windows® variety of operating system, the interception can occur via a DllMain( ) routine that is invoked with a dwReason parameter indicating a "thread attach" status. This routine can query the identifier (ID) of a thread and add the thread to the thread tracking list.

Figure 6:
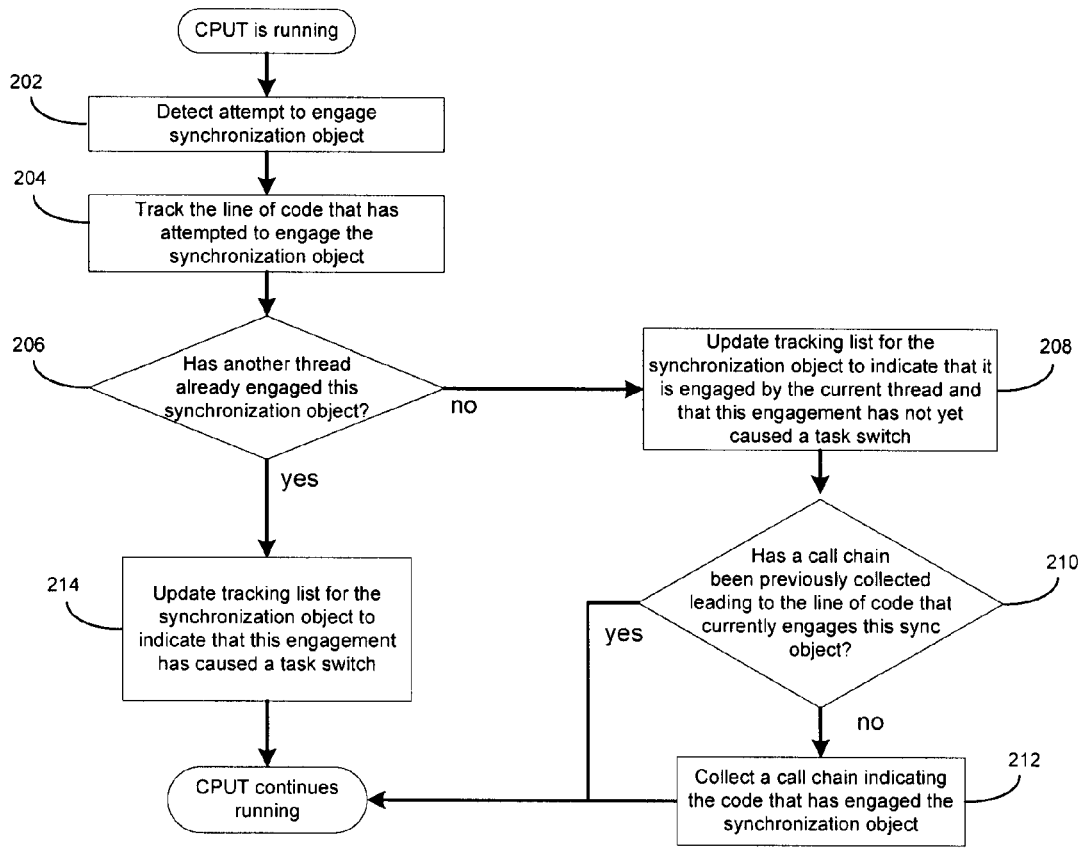
FIG. 6 is a flowchart of a portion of the lock suitability analysis process of FIG. 1.

Referring to FIG. 6, there is shown one embodiment of a process 200 for detecting engagement of a synchronization object by a thread. During execution of CPUT, process 200 may detect 202 an attempt to engage a synchronization object. Once detected 202, the lines of code that attempted to engage the synchronization object may be tracked 204 within the above-described synchronization object tracking list. The elements included within the synchronization object tracking list may include "suitability" and "unsuitability" counters, wherein these "suitability" and "unsuitability" counters may apply to the overall engagement of the synchronization object for an entire set of resources. Each list element within the synchronization object tracking list may be associated with a call chain that may indicate the means by which execution has reached the line of code that has engaged the synchronization object. When the user of e.g., lock suitability analysis process 10 requests a report defining the unnecessary use of synchronization objects, the call chains for the list elements (included within the synchronization object tracking list) that are associated with apparently unnecessary synchronization object protection may be of interest to the software developer.

A determination 206 may be made concerning whether another thread has already engaged the subject synchronization object. If 206 another thread has not already engaged the subject synchronization object, the synchronization object tracking list for the subject synchronization object may be updated 208 to indicate that the subject synchronization object is engaged by the current thread and that this engagement has not caused a task switch.

Task switching refers to the situation in which a computer system executes one thread, and prior to completing execution of that thread, switches contexts to begin executing a different thread. Task switching may occur under several different circumstances. For example, one situation in which task switching may occur is when a thread runs out of time. As time slicing computer system typically allots a predetermined amount of time to completely execute each thread, when that time period expires, the computer system may switch to begin executing another task. While task switching allows for parallel execution of multiple threads, overly frequent task switching may cause execution of thread management tasks to consume a large percentage of processing time, which may degrade performance.

Another situation in which a computer system switches tasks may be attributable to a "blocking condition". A blocking condition occurs when a thread needs access to a resource that is protected by a synchronization object engaged by another thread. So long as that resource is thus protected, the blocked thread is not given the opportunity to run. A blocking condition may result in failure of threads to perform actual work, which may degrade performance.

Once the synchronization object tracking list is updated 208, process 200 may determine 210 if a call chain (i.e., that defines the means by which the line of code that engaged the subject synchronization object was reached during execution of CPUT) had been previously collected. If not, process 200 may collect 212 the call chain. When collecting 212 the call chain, process 200 may walk the call chain in a manner similar to a debugger updating its call stack display. Alternatively, the runtime analysis tool may record a thread stack list element at each function entry, including the starting address of the function, and remove that list element when the function exits. Thus, a call chain may be obtained (that includes only the instrumented functions of the CPUT) at any time by walking the recorded list.

Alternatively, if 206 another thread had already engaged the subject synchronization object, the synchronization object tracking list for the subject synchronization object may be updated 210 to indicate that the engagement of the subject synchronization object has caused a task switch (i.e., from the previously-engaged thread to the newly-engaged thread).

Figure 7:
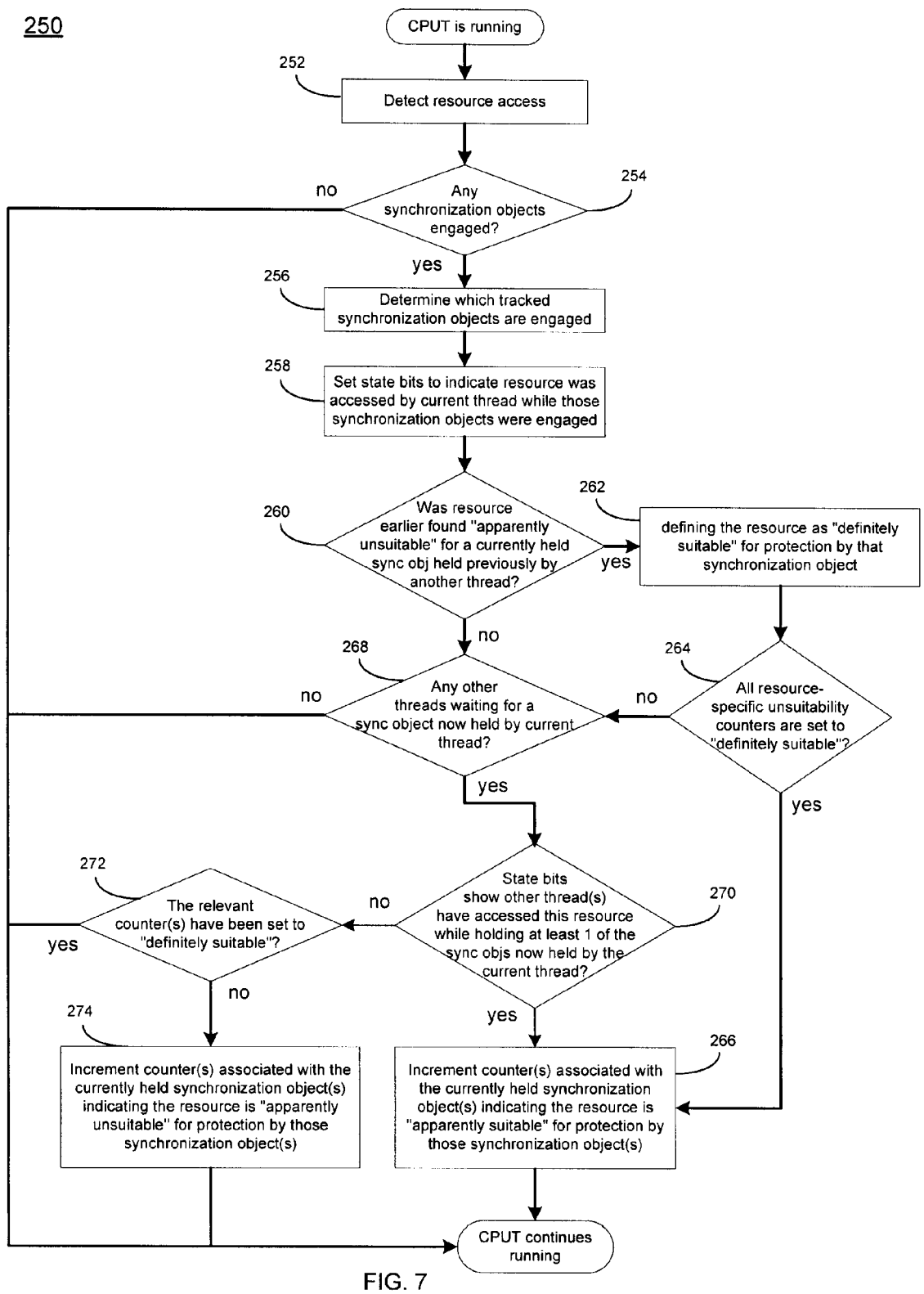
FIG. 7 is a flowchart of a portion of the lock suitability analysis process of FIG. 1.

Referring to FIG. 7, there is shown one embodiment of a process 250 for defining resources as one of "apparently unsuitable", apparently suitable", and "definitely suitable". By monitoring all threads created during the execution of CPUT, and monitoring the resources accessed by each of those threads, process 10 may identify those resources that are accessed by only one thread (i.e., "apparently unsuitable" resources).

A set of apparent suitability and unsuitability counters may be associated with each tracked resource (e.g., one of each of these two counters for each tracked resource, for example).

The "apparently unsuitable" counter may be incremented when the resource is accessed while the associated synchronization object is held, if that synchronization object has never been held by any other threads when the resource was previously accessed (according to the state bits). The "apparently suitable" counter may be incremented when the resource is accessed while at least one of currently-held synchronization objects (other than the synchronization object associated with this pair of counters) has also been held when the resource was previously accessed by one or more other threads. Note that these counters may not be incremented if the synchronization object has been determined to be "definitely suitable" for use with the resource.

The "apparently unsuitable" counter may be set to a special value (e.g., −1) to indicate that the synchronization object is "definitely suitable" for use with the resource. That happens when the resource is accessed while the synchronization object is held, and the same synchronization object was also held when the resource was previously accessed by one or more other threads. After setting the "apparently unsuitable" counter to the special value, this counter may keep that value for the duration of the execution of CPUT. Further, even after completion of the execution of CPUT, the "apparently suitable" counter need not be modified.

The above counters may be tracked as part of each tracking structure in a list of tracked resources. Both counters may be initialized to zero at the start of the execution of CPUT. The "apparently suitable" counter accommodates situations in which e.g., a set of synchronization objects is used to protect a set of objects, and a particular synchronization object may come and go from the set in various circumstances that may have nothing to do with access to a particular resource.

Process 250 may include a tracking structure for each line of code that acquires a synchronization object. This tracking structure may includes an "apparently unsuitable" counter that may be initialized to zero at the start of the execution of CPUT. The "apparently unsuitable" counter may be incremented when the synchronization object acquired by the line of code is disengaged, if a task switch and/or wait state has resulted, and if the resources accessed while the lock was held (during that intervening time since that line of code was executed) were "apparently unsuitable" for protection by that synchronization object. Process 250 may determine a suitability/unsuitability ratio for the resources accessed during that intervening time. Note that if a resource accessed during that intervening time was found to be "definitely suitable" for protection by that synchronization object, then the line of code itself may also be suitable, and the synchronization object's "unsuitability" counter may be set to a special value (e.g., −1).

Upon detecting 252 a resource being accessed (by e.g., a thread), process 250 may determine 254 if any synchronization objects are engaged. If so, process 250 may determine 256 which synchronization objects are engaged. State bits may be set 258 to indicate that the resource was accessed by the current thread while synchronization objects were engaged.

If 260 the resource being accessed was previously found "apparently unsuitable" for a currently held synchronization object previously held by another thread, process 250 may define 262 the resource as "definitely suitable" for protection by the synchronization object.

Process 250 may determine 264 whether all resource-specific unsuitability counters are set to "definitely suitable". If 264 so, the counter associated with the currently held synchronization object may be incremented 266 and the resource may be defined as "apparently suitable" for protection by those synchronized objects. If 264 all resource-specific unsuitability counters are not set to "definitely suitable", process 250 may determine 268 if any other threads are waiting for a synchronization object now held by the current thread. If 268 so, process 250 may determine 270 if the state bits show that other threads have accessed this resource while holding at least one of the synchronization objects now held by the current thread. If 270 so, the counter associated with the currently held synchronization object may be incremented 266 and the resource may be defined as "apparently suitable" for protection by those synchronized objects. If 270 not, process 250 may determine 272 if the relevant counter(s) have been set to "definitely suitable". If 272 not, the counter associated with the currently held synchronization object may be incremented 274 and the resource may be defined as "apparently unsuitable" for protection by those synchronized objects.

Figure 8:
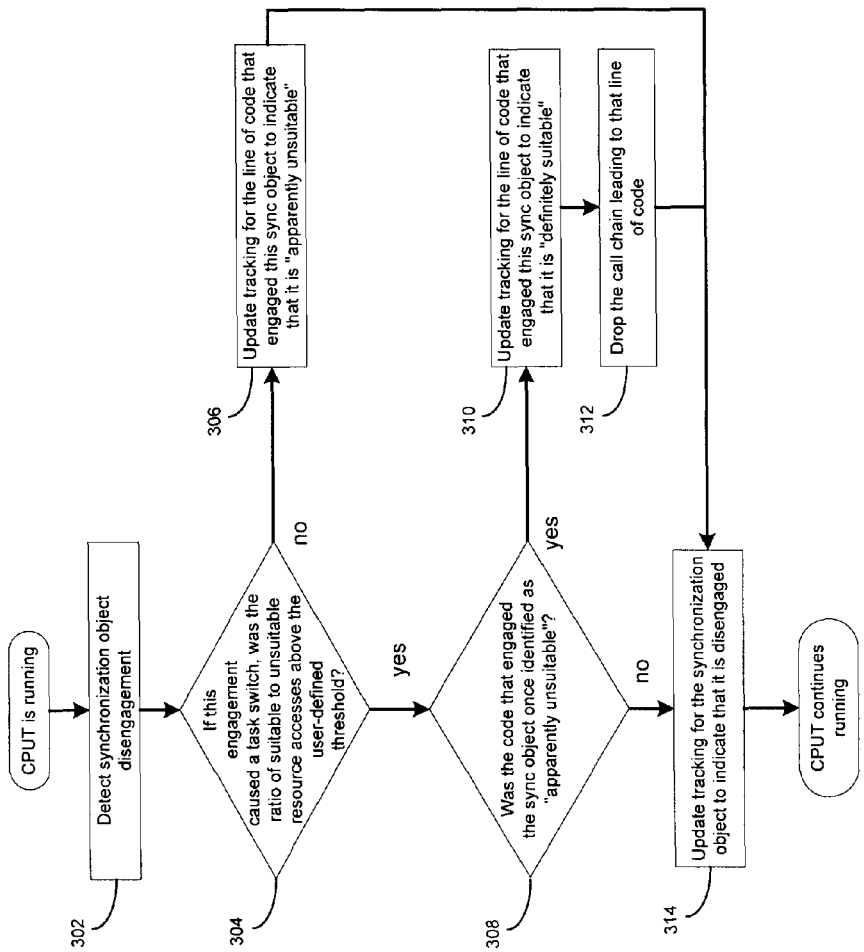
FIG. 8 is a flowchart of a portion of the lock suitability analysis process of FIG. 1.

Referring to FIG. 8, there is shown one embodiment of a process 300 for disengaging a synchronization object. Upon detecting 302 that the subject synchronization object is being disengaged by a thread, process 300 may determine 304 whether the engagement of the subject synchronization object caused a task switch and, if so, whether the ratio of "suitable" resource access to "unsuitable" resource accesses was above a user-defined threshold. When setting the user-defined threshold, the threshold may be initially set so that there are no false reportings. The threshold may subsequently be adjusted to obtain the results desired by the user.

If the engagement of the subject synchronization object did not cause a task switch and/or if the ratio was not above the above-described user-defined threshold, process 300 may update 306 the tracking list for the line(s) of code that engaged the subject synchronization object to indicate that the use of this synchronization object by these line(s) of code is "apparently unsuitable".

If the engagement of the subject synchronization object did cause a task switch and if the ratio exceeded the above-described user-defined threshold, process 300 may determine 308 if the line(s) of code that engaged the subject synchronization object were previously identified as "apparently unsuitable". If 308 the code that engaged the synchronization object was previously identified as "apparently unsuitable", process 300 may update 310 the tracking list for the line(s) of code that engaged the subject synchronization object to indicate that the use of this synchronization object by these line(s) of code is "definitely suitable". Further, process 300 may drop 312 the call chain leading to the line of code. For example, a call chain may be dropped by e.g., deallocating the memory on which the call chain was stored.

If 308 the code that engaged the synchronization object was not previously identified as "apparently unsuitable", process 300 may update 314 the synchronization object tracking list to indicate that the subject synchronization object is disengaged.

Figure 9:
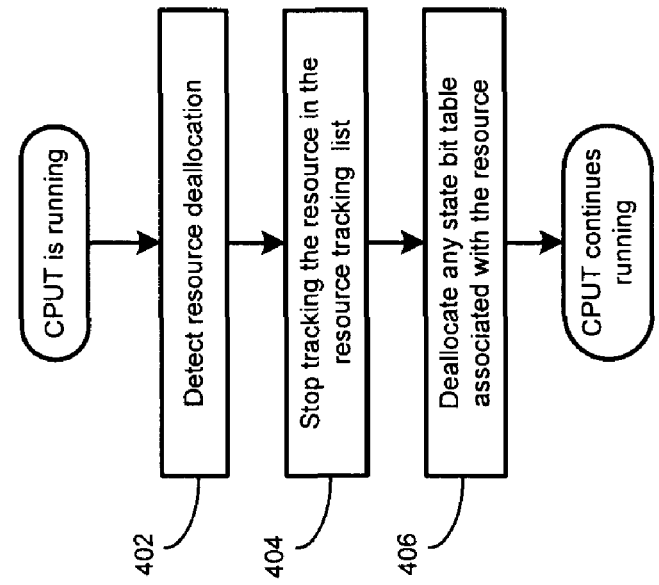
FIG. 9 is a flowchart of a portion of the lock suitability analysis process of FIG. 1.

Referring to FIG. 9, there is shown one embodiment of a process 350 for reporting incidences of "apparently unsuitable" lines of code. Process 350 may detect 352 a termination of CPUT or a request for current data output from CPUT. Process 350 may determine 354 if any lines of code that engaged synchronization objects were deemed "apparently unsuitable". If 354 any lines of code were deemed "apparently unsuitable", process 350 may report 356 any such lines of code (that have an unsuitability count that exceeds the user-defined threshold) to e.g., the software developer to aid in the optimization and improvement of CPUT. It may be useful to also provide the call chain defining how the "apparently unsuitable" lines of code were reached during execution of CPUT.

Figure 10:
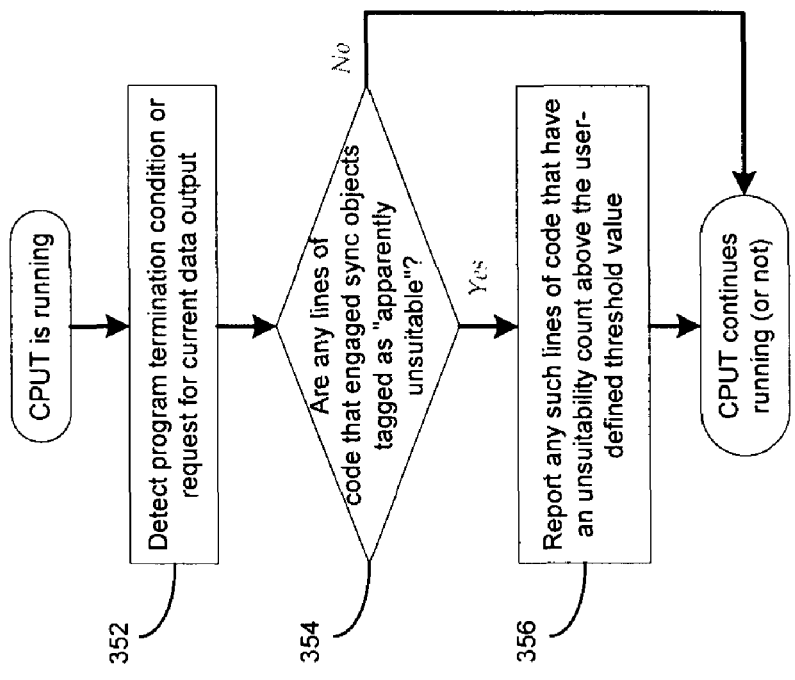
FIG. 10 is a flowchart of a portion of the lock suitability analysis process of FIG. 1.

Referring to FIG. 10, there is shown one embodiment of a process 400 for deallocating a resource. When process 400 detects 402 a resource deallocation, process 400 may stop 404 tracking the resource in the resource tracking list (described above) and deallocate 406 any state bit table (described above) associated with the deallocated resource.

Figure 11:
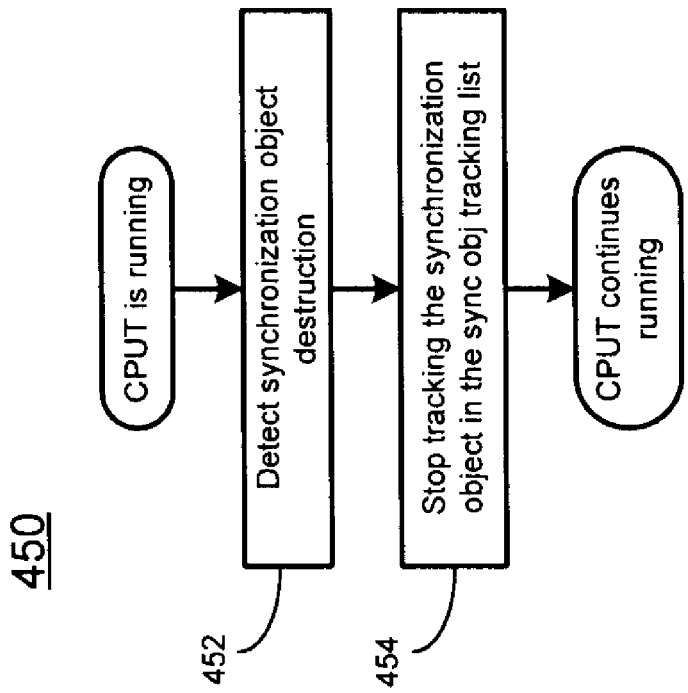
FIG. 11 is a flowchart of a portion of the lock suitability analysis process of FIG. 1.

Referring to FIG. 11, there is shown one embodiment of a process 450 for deconstructing a synchronization object. When process 450 detects 452 synchronization object deconstruction, process 450 may stop tracking 454 the synchronization object in the synchronization object tracking list (described above).

Figure 12:
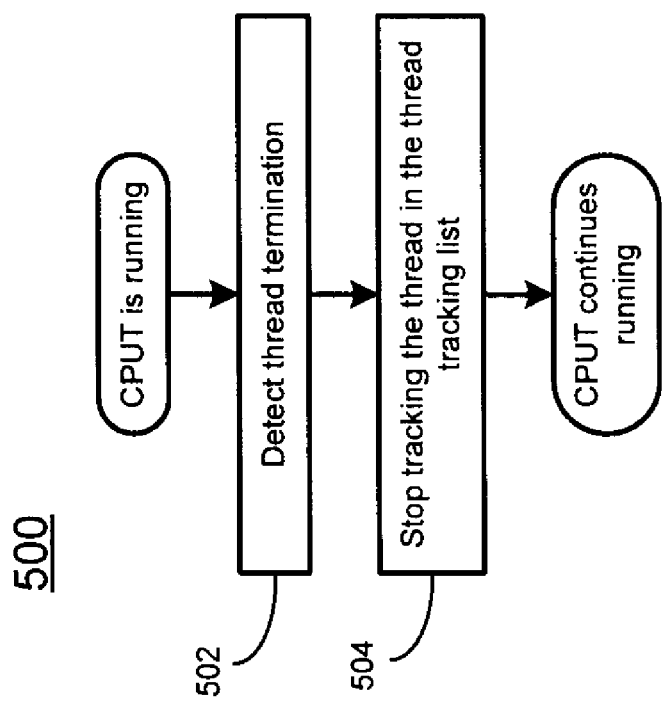
FIG. 12 is a flowchart of a portion of the lock suitability analysis process of FIG. 1.

Referring to FIG. 12, there is shown one embodiment of a process 500 for terminating a thread. Upon process 500 detecting 502 thread termination, process 500 may stop tracking 504 the thread in the thread tracking list.

A number of implementations have been described. Nevertheless, it will be understood that various modifications may be made. Accordingly, other implementations are within the scope of the following claims.

What is claimed is:

1. A lock suitability analysis method comprising:
   detecting, during execution of a computer program under test (CPUT), an allocation of a resource;
   creating a list entry for the allocation of the resource in a resource tracking list;
   setting state bits for the allocation of the resource in a state bit table anchored by the list entry;
   determining if a first thread attempted to engage a synchronization object associated with the resource;
   updating the state bits in the state bit table responsive to the determination;
   determining if a second thread engaged the synchronization object associated with the resource;
      if so, updating a synchronization object tracking list for the synchronization object to indicate that the synchronization object has caused a task switch to the first thread from the second thread; and
      if not, updating the synchronization object tracking list for the synchronization object to indicate that the synchronization object is currently-held by the first thread;
   detecting an access of the resource by the second thread;
   determining by a processor if the resource was previously-defined "apparently unsuitable" for the synchronization object associated with the resource;
      if so, re-defining the resource as "definitely suitable" for protection by the synchronization object associated with the resource; and generating a report using a synchronization object tracking list.

2. The method of claim 1 further comprising:
   defining one or more engaged synchronization objects associated with the resource; and
   setting one or more state bits to indicate that the resource was accessed by the second thread while the one or more engaged synchronization objects were engaged.

3. The method of claim 2 further comprising:
   determining if one or more other threads have accessed the resource while holding at least one of the one or more engaged synchronization objects associated with the resource now held by the second thread; and
   if so, incrementing one or more counters associated with the at least one of the one or more engaged synchronization objects to indicate that the resource is "apparently suitable" for protection by the at least one of the one or more engaged synchronization objects.

4. The method of claim 2 further comprising:
   determining if one or more counters associated with the at least one of the one or more engaged synchronization objects indicate that the resource is "definitely suitable" for protection by the at least one of the one or more engaged synchronization objects; and
   if not, incrementing the one or more counters associated with the at least one of the one or more engaged synchronization objects to indicate that the resource is "apparently unsuitable" for protection by the at least one of the one or more engaged synchronization objects.

5. The method of claim 1 further comprising:
   detecting a program termination condition and/or a data request;
   determining if one of the first and second thread that engaged the synchronization object is defined as "apparently unsuitable"; and
   if so, reporting at least one of the first and second thread.

6. A computer program product comprising a non-transitory computer readable storage medium including a computer readable program, wherein the computer readable program when executed on a computer causes the computer to:
   detect, during execution of a computer program under test (CPUT), an allocation of a resource;
   create a list entry for the allocation of the resource in a resource tracking list;
   set state bits for the allocation of the resource in a state bit table anchored by the list entry;
   determine if a first thread attempted to engage a synchronization object associated with the resource;
   update the state bits in the state bit table responsive to the determination;
   determine if a second thread engaged the synchronization object associated with the resource;
      if so, update a synchronization object tracking list for the synchronization object to indicate that the synchronization object has caused a task switch to the first thread from the second thread; and
      if not, update the synchronization object tracking list for the synchronization object to indicate that the synchronization object is currently-held by the first thread; detect an access of the resource by the second thread;
   determine if the resource was previously-defined "apparently unsuitable" for the synchronization object associated with the resource; and
      if so, re-define the resource as "definitely suitable" for protection by the synchronization object associated with the resource; and generate a report using a synchronization object tracking list.

7. The computer program product of claim 6 further comprising instructions for:
   defining one or more engaged synchronization objects associated with the resource; and
   setting one or more state bits to indicate that the resource was accessed by the second thread while the one or more engaged synchronization objects were engaged.

8. The computer program product of claim 7 further comprising instructions for:
   determining if one or more other threads have accessed the resource while holding at least one of the one or more engaged synchronization objects associated with the resource now held by the second thread; and
   if so, incrementing one or more counters associated with the at least one of the one or more engaged synchronization objects to indicate that the resource is "apparently suitable" for protection by the at least one of the one or more synchronization objects.

9. The computer program product of claim 7 further comprising instructions for:
- determining if one or more counters associated with the at least one of the one or more synchronization objects indicate that the resource is "definitely suitable" for protection by the at least one of the one or more synchronization objects; and
- if not, incrementing the one or more counters associated with the at least one of the one or more engaged synchronization objects to indicate that the resource is "apparently unsuitable" for protection by the at least one of the one or more engaged synchronization objects.

10. The computer program product of claim 6 further comprising instructions for:
- detecting a program termination condition and/or a data request;
- determining if one of the first and second thread that engaged the synchronization object is defined as "apparently unsuitable"; and
- if so, reporting at least one of the first and second thread.

11. A lock suitability analysis method comprising:
- detecting, during execution of a computer program under test (CPUT), an allocation of a resource;
- creating a list entry for the allocation of the resource in a resource tracking list;
- setting state bits for the allocation of the resource in a state bit table anchored by the list entry;
- determining if a first thread attempted to engage a synchronization object associated with the resource;
- updating the state bits in the state bit table responsive to the determination;
- determining if a second thread engaged the synchronization object associated with the resource;
  - if so, updating a synchronization object tracking list for the synchronization object to indicate that the synchronization object has caused a task switch to the first thread from the second thread; and
  - if not, updating the synchronization object tracking list for the synchronization object to indicate that the synchronization object is currently-held by the first thread;
- determining if a call chain has been previously-collected for one of the first and second thread that is currently engaging the synchronization object;
  - if not, collecting the call chain;
- detecting an attempt to disengage the synchronization object;
- determining by a processor if an engagement of the synchronization object caused a task switch and a ratio of "definitely suitable" resource accesses to "apparently unsuitable" resource accesses was above a user-defined threshold; and
  - if not, updating the synchronization object tracking list to indicate that the resource is "apparently unsuitable" for protection by the synchronization object; and
- generating a report using a synchronization object tracking list.

12. The method of claim 11 further comprising:
- determining if one of the first and second thread that engaged the synchronization object was once identified as "apparently unsuitable";
- if so, updating the synchronization object tracking list for the one of the first and second thread to indicate that the resource is "definitely suitable" for protection by the synchronization object; and
- dropping the call chain for one of the first and second thread.

13. A computer program product comprising a non-transitory computer readable storage medium including a computer readable program, wherein the computer readable program when executed on a computer causes the computer to:
- detect, during execution of a computer program under test (CPUT), an allocation of a resource;
- create a list entry for the allocation of the resource in a resource tracking list;
- set state bits for the allocation of the resource in a state bit table anchored by the list entry;
- determine if a first thread attempted to engage a synchronization object associated with the resource;
- update the state bits in the state bit table responsive to the determination;
- determine if a second thread engaged the synchronization object associated with the resource;
  - if so, update a synchronization object tracking list for the synchronization object to indicate that the synchronization object has caused a task switch to the first thread from the second thread; and
  - if not, update the synchronization object tracking list for the synchronization object to indicate that the synchronization object is currently-held by the first thread;
- determine if a call chain has been previously-collected for one of the first and second thread that is currently engaging the synchronization object;
  - if not, collecting the call chain;
- detect an attempt to disengage the synchronization object; determine if an engagement of the synchronization object caused a task switch and a ratio of "definitely suitable" resource accesses to "apparently unsuitable" resource accesses was above a user-defined threshold; and
  - if not, update the synchronization object tracking list to indicate that the resource is "apparently unsuitable" for protection by the synchronization object; and
- generate a report using a synchronization object tracking list.

14. The computer program product of claim 13 further comprising instructions for:
- determining if one of the first and second thread that engaged the synchronization object was once identified as "apparently unsuitable";
- if so, updating the synchronization object tracking list for one of the first and second thread to indicate that the resource is "definitely suitable" for protection by the synchronization object; and
- dropping the call chain for one of the first and second thread.

* * * * *